United States Patent [19]
Naumann

[11] 3,880,282
[45] Apr. 29, 1975

[54] PROBE SHEATH AND PROCESS OF MAKING SAME

[76] Inventor: John R. Naumann, 347 North 5th East, Brigham City, Utah 84302

[22] Filed: Jan. 12, 1973

[21] Appl. No.: 322,966

[52] U.S. Cl............ 206/306; 264/328; 73/362 AR; 206/69
[51] Int. Cl............................................. B65d 85/08
[58] Field of Search ............ 206/16.5, 306, 212, 69; 73/362 AR; 264/328, 336; 215/1 C

[56] References Cited
UNITED STATES PATENTS
2,768,736 10/1956 Govoni .......................... 206/16.5
2,910,174 10/1959 Reid ............................... 206/16.5
3,677,680 7/1972 Etherington ..................... 264/328
3,729,998 5/1973 Mueller et al. .................. 206/16.5

*Primary Examiner*—William T. Dixson, Jr.
*Attorney, Agent, or Firm*—Criddle & Thorpe

[57] ABSTRACT

A solid wall sheath for use on probes of electronic thermometers. The probe is of tapered configuration, having a wall thickness at a small closed tip end of between 0.05 inch and 0.012 inch. The probe is formed by injecting a suitable plastic material into a mold around shaped inserts or mandrels, through an orifice opening having a throat diameter of from 0.007 inch to 0.0021 inch.

4 Claims, 6 Drawing Figures

PATENTED APR 29 1975 3,880,282

PROBE SHEATH AND PROCESS OF MAKING SAME

BRIEF DESCRIPTION OF THE INVENTION

1. Field of the Invention

This invention relates to protective sheaths for use with electronic thermometers.

2. Prior Art

In recent years, there has been a growing demand for electronic thermometer units that will quickly determine the body temperature of animals or humans being tested. Many of the electronic thermometers developed utilize probe elements having temperature responsive sensing means in a tip end thereof and electric circuitry connecting the temperature responsive sensing means to a readout device. While in some instances the developers of such thermometers have advocated that the probe elements be individually sterilized between uses, it is now generally considered more advantageous from a convenience and economy standpoint to buy a disposable sheath that can be used for each individual temperature reading obtained. Such sheaths, of course, must be low in cost, so that they are economically usable, and must afford rapid heat transfer from the area in which the temperature is being sensed to the heat element in the tip of the probe. U.S. Pat. Nos. 3,349,896, 3,254,533, and 3,469,685, all disclose protective sheaths for use with temperature sensing devices. However, these known sheaths are too expensive to produce, do not permit sufficiently rapid heat transfer therethrough, are not reliable or are not adaptable to use on probes of different types.

SUMMARY OF THE INVENTION

Principal objects of the present invention are to provide an extremely low cost, easily handled, reliable, and entirely sanitary sheath suitable for use with electronic thermometers.

Other objects of the invention are to provide a method of manufacturing a solid wall sheath such that the resultant sheath will readily transmit heat therethrough to the sensing element of the probe placed therein.

Principal features of the invention include a sheath with a generally tapered and stepped configuration terminating at a closed small end having a thin wall and with an enlarged opening at the other end to receive a probe retaining member.

The sheath is preferably manufactured by using a fixed plate having mandrels projecting therefrom that are shaped to conform to the interior of the sheath. A removable plate having cavities conforming to the outer dimensions of the desired sheath, is arranged to reciprocate onto and off of the mandrels projecting from the fixed plate. The plastic from which the sheaths are to be made is fed into the cavities of the movable plate and around the mandrel members through a very small orifice at the small end of each cavity. The opening size is calculated such that upon cessation of plastic feed through the opening the plastic will flow across and close the opening. When the movable plate is withdrawn, the formed sheaths adhere to and remain on the mandrels. Thereafter, the sheaths are stripped from the mandrels for packaging.

Additional objects and features of the invention will become apparent from the following detailed description, taken together with the accompanying drawings.

THE DRAWINGS

FIG. 1 is a plan view of the sheath of the present invention;

FIG. 2, a vertical section through the sheath of FIG. 1, taken on the line 2—2, and with a probe of an electronic thermometer shown in dotted lines positioned therein;

FIG. 3, a schematic diagram of the preferred apparatus used to form the sheath of FIG. 1;

FIG. 4, a vertical section taken on the line 4—4 of FIG. 3;

FIG. 5, a vertical section taken on the line 5—5 of FIG. 3; and

FIG. 6, a transverse sectional view taken on the line 6—6 of FIG. 5.

DETAILED DESCRIPTION

Figure 1:
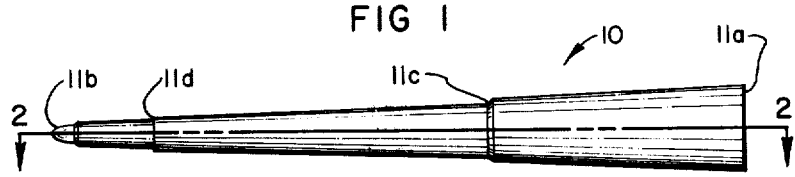
Figure 2:
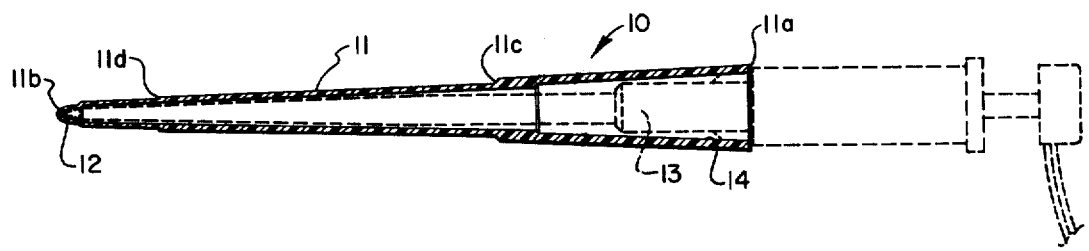
Figure 3:
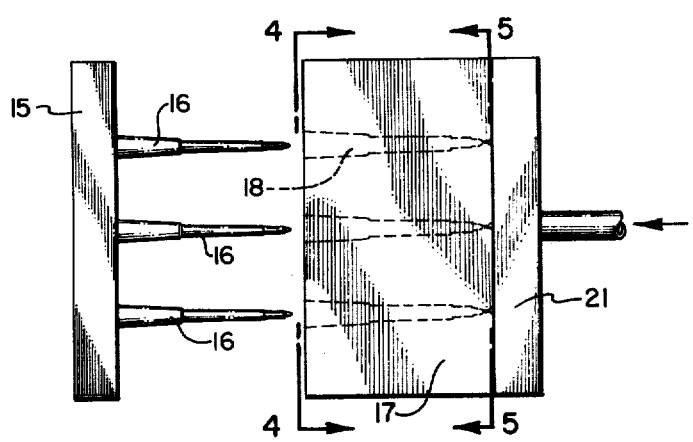
Figure 4:
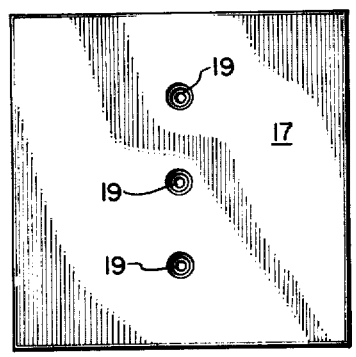
Figure 5:
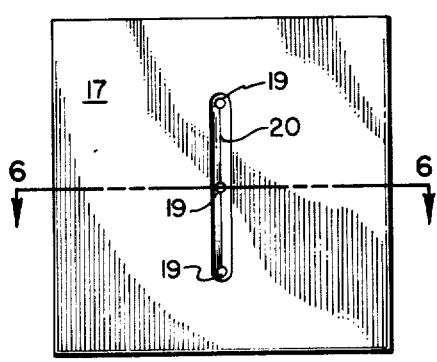
Figure 6:
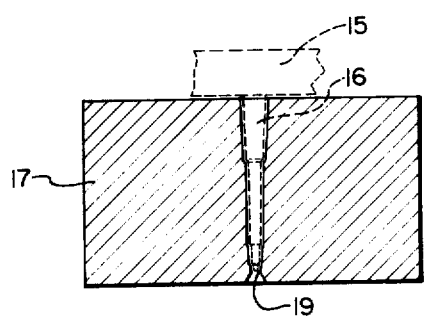

Referring now to the drawings:

In the illustrated preferred embodiment, the sheath of the present invention is shown generally at 10. As shown, the sheath includes an outer wall 11 that is generally tapered from a large end 11a to a small end 11b. The wall 11 is stepped at 11c and 11d and the wall thickness of the portion of the wall extending between end 11a and step 11d is considerably thicker than is the wall thickness of the portion of the wall extending between step 11d and end 11b. The thickness of the wall portion between the end 11a and the step 11d must be sufficient to provide adequate strain to the sheath so that it will not be readily crushed during installation and so that it will maintain a constant interior configuration for frictional engagement with a retaining means on a probe of an electronic thermometer. It has been found that a wall thickness of about 0.039 inch is satisfactory for use with styrene, polypropolene, polyethylene plastics. The wall thickness of the wall portion extending from step 11d to end 11b must be considerably thinner, so that a rapid heat transfer will be obtained through the wall. It has been found that in order to obtain a satisfactory response time, i.e. under fifteen seconds, for temperature readout of the electronic thermometer, it is necessary that this wall thickness be not more than 0.012 inch. In practice, it has been found most desirable that the surrounding wall thickness be not more than 0.005 inch. At the very tip end a depression 12 is formed on the inside of wall 11. The thickness of the material across the tip end is then no more than about 0.002 inch. Thus, the greatest heat transfer occurs at the tip end of the sheath, and since only the very tip end has the extremely thin wall construction, the overall sheath has sufficient strength to withstand normal handling operations.

In use, the sheath 10 is inserted over the probe 13 (shown in dotted lines) of an electronic thermometer, not shown. The sheath is held in place by friction engaging means 14 projecting from the sides of the probe in the vicinity of the large end 11a of the sheath. The sheath is particularly adapted for use on probes such as those manufactured by the Ivac Corporation and which are readily commercially available. When properly installed, the tip of the probe fits into depression 12 such that heat transferred through the wall at the depression will be rapidly sensed by the tip of the probe.

In my preferred method of manufacture of the sheath 10, a fixed stripper plate 15 has projecting mandrels 16 shaped and tapered to conform to the interior of the sheath 10, projecting therefrom. The large ends of the mandrels 16 are fixed to the stripper plate and the small ends are spaced therefrom. A movable mold 17 has cavities formed therein and arranged such that movement of the mold 17 towards plate 15 will telescope the cavities over and around the projecting mandrels. The cavities 18 are shaped to conform to the outer wall of sheath 10 and the plastic material from which the sheath is to be made is fed into the cavities 18 at the small ends thereof through orifices 19.

An orifice 19 extends through the mold to the tip end of each cavity 18. Plastic from which a sheath 10 is to be formed is forced through each orifice 19 until it surrounds the mandrel 16 within the cavity 18.

Runner grooves 20 on the face of the movable mold interconnect each of the orifices 19 so that plastic applied under pressure through a feed plate 21 pressed against the mold 17 to the runner grooves will be uniformly distributed to the orifices 19. The use of the stripper plate, movable mold and feed plate and machines on which such structures are used are well known and will not be discussed further herein.

It is necessary to the invention that each orifice 19 have a diameter of less than about 0.21 inch. The orifice size is critical since if it is enlarged, the thin walled depression 12 will not be properly formed and the small end of the sheath will not be closed. With the orifices 19 of proper size, i.e. less than about 0.21 inch in diameter, after plastic has filled the space around each mandrel 16 within the cavities 18 and plastic flow through the orifices has been discontinued, withdrawal of the mandrels from the cavities, while the plastic therein is still in a moldable state will cause the plastic forming the side wall of the sheath small end to draw completely over the end of the mandrel before breaking from that material remaining in orifice 19. The drawing down of the side wall results in a controlled thickness of the wall forming the depression 12 and insures a rapid heat transfer through the thin wall to a probe placed in the sheath so formed.

If the orifices 19 are not made sufficiently large, there will not be enough plastic therein to hold and draw down the tip side wall portion. Thus, if the orifices are made to have diameters of less than about 0.007 inch, satisfactory sheaths 10 cannot be obtained.

Although a preferred form of my invention has been herein disclosed, it is to be understood that the present disclosure is made by way of example, that variations are possible without departing from the scope of the hereinafter subject matter, which subject matter I regard as my invention.

I claim:

1. A disposable sheath for a temperature sensing probe, said sheath comprising
   a one-piece, tapered, hollow body having
   a rigid wall;
   an enlarged open end;
   a substantially rigid, closed small end;
   the wall thickness at said enlarged open end being sufficiently thick to allow handling of the sheath without deformation of the enlarged open end; and
   the wall thickness at the closed small end being smaller than the wall thickness at the enlarged open end, whereby rapid heat transfer is obtained through the wall at the closed small end.

2. A disposable sheath as in claim 1, wherein
   the closed small end has a depression formed in the tip end thereof to receive a sensing element of a probe of an electronic thermometer.

3. A disposable sheath as in claim 2, wherein
   the wall thickness at the small end adjacent to the depression is not greater than 0.012 inch.

4. A disposable sheath as in claim 3, wherein
   the wall thickness of the depression is not more than 0.02 inch.

* * * * *